Oct. 6, 1953 — E. C. WAHLBERG — 2,654,235
FLEXIBLE SHAFT COUPLING
Filed Aug. 26, 1948 — 3 Sheets-Sheet 1

INVENTOR.
ERIC C. WAHLBERG
BY Frank J. Novotny
ATTORNEY.

Oct. 6, 1953  E. C. WAHLBERG  2,654,235
FLEXIBLE SHAFT COUPLING
Filed Aug. 26, 1948  3 Sheets-Sheet 2

INVENTOR.
ERIC C. WAHLBERG
BY
ATTORNEY.

Oct. 6, 1953   E. C. WAHLBERG   2,654,235
FLEXIBLE SHAFT COUPLING
Filed Aug. 26, 1948   3 Sheets-Sheet 3

INVENTOR.
ERIC C. WAHLBERG
BY Frank J. Novotny
ATTORNEY.

UNITED STATES PATENT OFFICE 2,654,235

FLEXIBLE SHAFT COUPLING

Eric C. Wahlberg, Stamford, Conn., assignor to Electrolux Corporation, Old Greenwich, Conn., a corporation of Delaware Application August 26, 1948, Serial No. 46,306

2 Claims. (Cl. 64—14)

This invention relates to a new type of cleaner and more specifically to a device adapted to remove dirt, debris and similar superficial stains from the surface of such delicate articles as eggs, thin glassware, glass globes and the like.

Basically this invention comprises a motor-fan unit for the obtainment of a suction current of air, the motor-fan unit being simultaneously used to drive a buffing wheel through reduction gearing. In addition a canister is utilized to collect the debris and buffer scrapings while a filtering device separates out the fine particles from the air current and allows the air current to pass therethrough.

It is an object of this invention to provide a compact, unitary device for cleaning eggs and similar fragile articles.

Another object is to provide a self centering coupling device for imparting rotation to a driven shaft and speed reduction gearing for driving a remotely positioned buffing wheel.

Still another object is to provide a motor-fan unit for removing polishings and loose particles from the operator's presence.

A further object is to provide a coupling capable of serving as a universal joint between two angularly disposed shafts.

A still further object is to provide a buffing device having a self-cleaning filter pad, the surface of which is readily cleaned by removing and reinserting the filter pad.

Further and additional objects will be disclosed below and still others will be readily suggested upon reading the accompanying disclosure of one embodiment of the invention, particularly when considered together with the accompanying drawings wherein.

Figure 1:
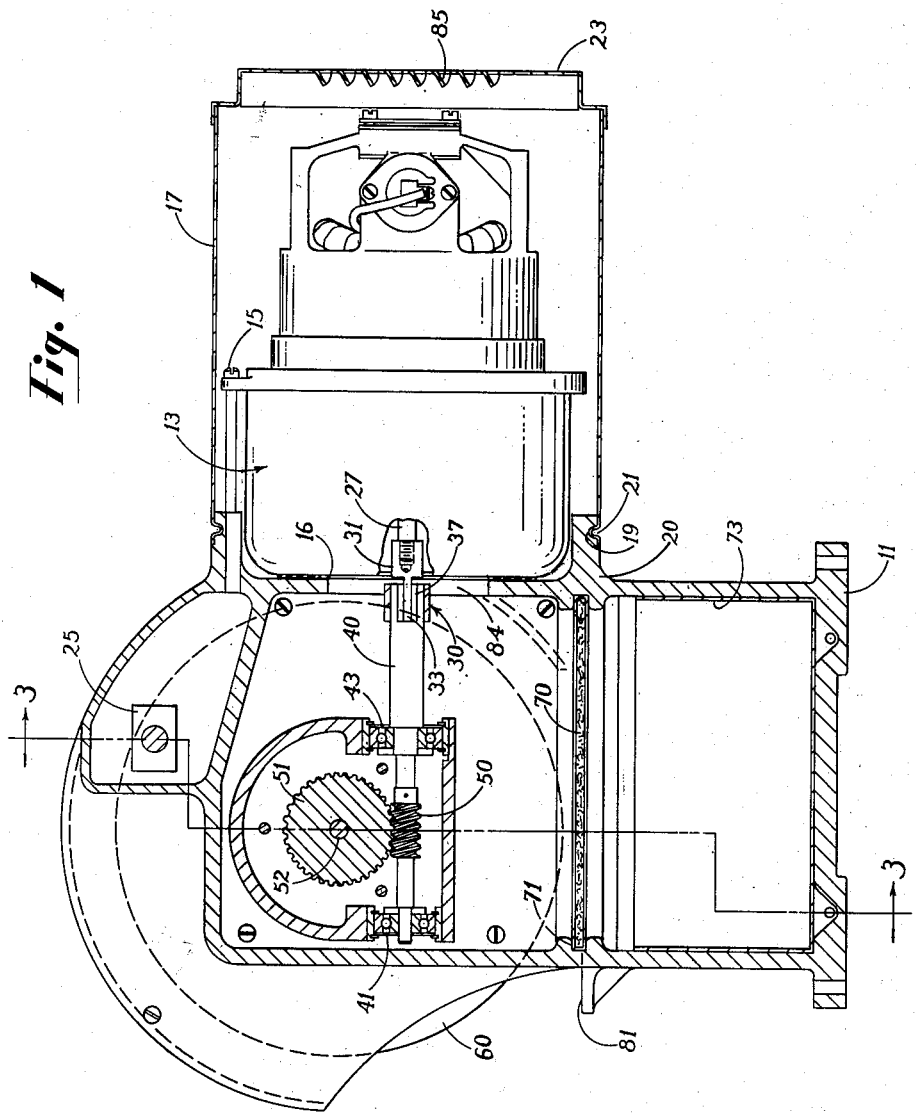
Fig. 1 is a longitudinal vertical sectional view of a buffing device taken on the line 1—1 of Fig. 3 and made in accordance with this invention.

Referring now in more detail to the drawings a base 11 supports the device which essentially comprises a motor-fan unit 13 mounted by bolt members 15 on one side of the base preferably through a cushioning, vibration absorbing rubber gasket 16. The unit 13 is encased within a tubular cover 17 which slips securely and telescopically over a machined cylindrical member 20 having a groove 19 cut in the outer surface thereof, the beaded flange 21 securely fitting into groove 19. A perforated cover 23 snapped over the open end of the tubular cover 17 allows for the easy egress of air from the motor-fan unit.

A switch 25 connects the motor to a source of current.

The flexible coupling 30 is one of the many features of the invention and comprises a nut element 31 affixed securely by a machined thread on the end of motor shaft 27.

Figure 2:
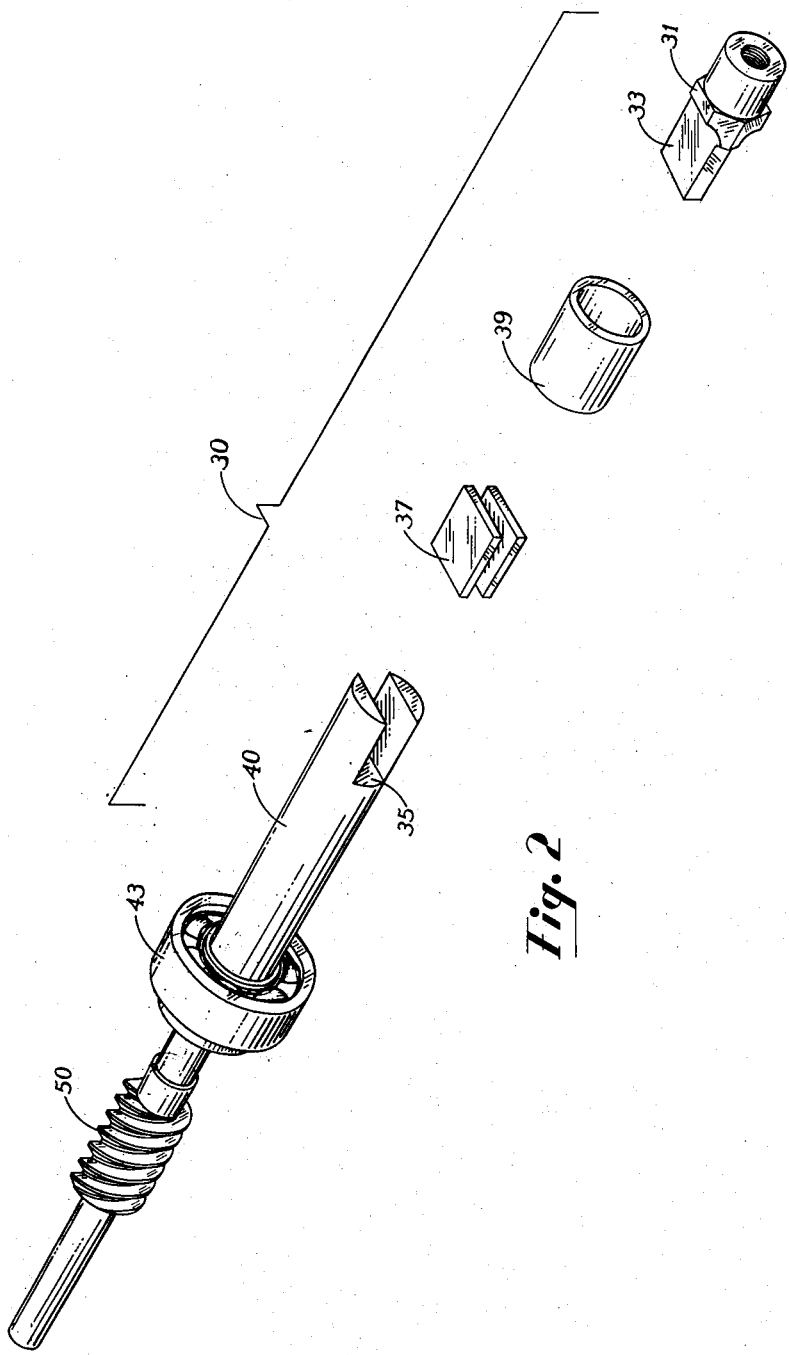
Fig. 2 is an exploded view, in perspective, of the self-centering coupling device described in more detail herein.

Driven shaft 40 is journalled in bearings 41 and 43 and is coupled to driving shaft 27 through the self-centering unit or flexible universal coupling 30. Coupling 30 comprises the tongue 33 (see Fig. 2) of nut 31 which tongue fits between the inner faces of groove 35 cut in shaft 40. Tongue 33 is preferably of a width less than the diameter of shaft 40 and any free space between its flat faces and the inner faces of groove 35 is taken up by the spacer elements 37 which are made of resilient material, i. e. rubber and like, between these faces, being positioned in sliding contact therewith. Spacer elements 37 render the coupling device highly flexible and in addition assure a more silent operation of the device, since motor noises are not transmitted therethrough to any great extent. The whole coupling unit 30 is held in operating position by ring 39 which fits tightly over the free end of shaft 40.

A spiral driving gear 50 is affixed to shaft 40 and drives, at a much lower speed, gear 51 which in turn drives shaft 52 (see Fig. 3) journalled in bearing members 53, 54 and has mounted on a free end thereof the buffing wheel 60.

An outwardly displaced lip 80, Fig. 3 extends cylindrically almost completely around the buffing wheel 60 except for a small opening just above the shelf-like member 81, Fig. 1, which opening gives access to the buffing wheel 60 from the outside, and an additional opening 82, Fig. 3, immediately below the buffing wheel which latter opening 82 gives access to the dust collecting chamber 73. Lip 80 together with cover 83 forms a dust collecting guard for the dust particles loosened from the surface of a buffed article by wheel 60.

A filter 70 is slidably fixed in grooves 71 cut in the side of base member 11. This filter is easily removed for cleaning or renewal by means of handle 72. In actual practice, the mere removal and reinsertion of filter 70 serves to scrape the adhering particles off the bottom side of the of the filter whereupon the apparatus is again conditioned for immediate and efficient buffing and dust collecting operation. A removable particle collecting container 73 fits into the bottom compartment of base 11 and serves to collect the dirt and dust particles which fall therein after their removal from an object by the buffing wheel, their entrainment in the air suction current, and separation from the air current by filter pad 70.

Figure 3:
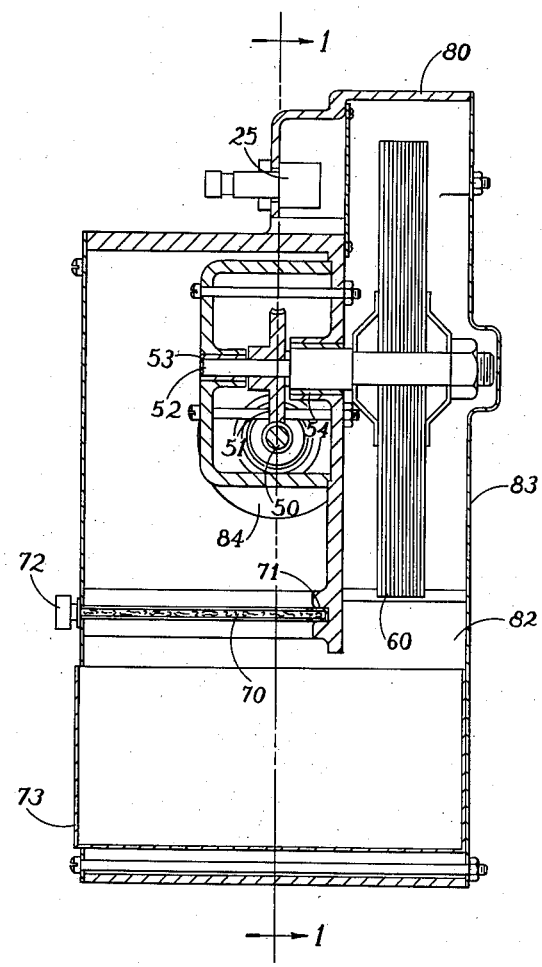
Fig. 3 is a cross-sectional vertical view taken on the line 3—3 of Fig. 1.

In operation, the dust particles removed by buffing wheel 60 are entrained by the air stream produced by the motor-fan unit 13 and are caused to follow a path downwardly within the dust collecting guard 80, through opening 82, Fig. 3, and into dust collecting chamber 73 where the heavier particles are deposited on the bottom while the lighter particles carried by the air stream continue therewith until they hit the bottom of dust screen 70. At this point the dust particles are separated from their entraining air stream which latter continues through the filter 70 and then through opening 84 to the motor-fan unit 13, finally emerging into the open air through blower outlet or louvers 85.

The driven shaft 40 is relatively fixed in position in its bearing mounts 41, 43 and its axis is therefor fixed in position. The driving shaft 27, because of the relatively flexible rubber mounting used on conventional motor-fan units 13 or because of its loose mounting on tie bolts 15 preliminary to final tightening, may be in considerable misalignment with the driven shaft. By utilizing the coupling device of this invention between the driving and the driven shafts, as shown in detail in Fig. 2, the driving shaft under rotation transmits a force which tends to orient the driving shaft so that the relative position of the two shafts finally assumes a fixed association of substantial alignment of their respective axes.

In more detail, when the motor-fan unit is first assembled with respect to the base member 11, the tongue 33 is inserted into the slot 35, the resilient spacing or spacer elements 37 being disposed between the broad tongue faces and the inside walls of the slot 35. The tie bolts 15 are then screwed in loosely so as to hold the motor-fan unit in approximately the correct position. If these bolts were tightened they would pull the motor-fan unit into a position such that its shaft 27 would be substantially parallel to shaft 40, but probably not in coaxial relation thereto, that is, the axis of the motor shaft 27 would probably be displaced laterally from the axis of shaft 40, the two axes having no point of intersection, and hence rotary motion could not be transmitted through the coupling 30 as thus set up.

However, if the motor-fan unit 13 is mounted and the motor started rotating with tie bolts 15 loosely screwed in position, then in this approximate assembly of the coupling unit 30 the driving shaft 27 under rotation transmits a force which at first tends to orient the axis of driving shaft 27 into a position wherein the axes of the driving shaft 27 and the driven shaft 40 intersect at a common point within the coupling.

Then continued further rotation of driving shaft 27 together with the simultaneous tightening of tie bolts 15 will result in the further application of this force whereupon the motor-fan unit 13 is pulled into a position such that the axis of driving shaft 27 is oriented into substantial coaxial alignment with the axis of driven shaft 40.

Further tightening of tie bolts 15 while the motor is running results in the motor-fan unit 13 being securely fixed in the most highly desirable position, an orientation wherein the two shafts, driving shaft 27 and driven shaft 40, are properly aligned substantially coaxially. Thus, with this type of self-centering coupling device the transmission of power from the driving shaft to the driven shaft is found to be free of any simultaneous whipping action or oscillatory motion on the part of the driving shaft.

Although the embodiment more specifically disclosed illustrates a use of the present invention wherein substantial axial alignment of a driving shaft and a driven shaft is highly desirable, it is to be understood that this coupling device may function as a universal joint by virtue of the compressible and resilient spacer elements 37, and hence provides a highly efficient device for the transmission of rotary motion where the axes of the driving and driven shafts are disposed at a considerable angle to each other.

Although a specific example embodying the invention has been given in considerable detail, it is to be understood that this is merely an illustrative and not a limitative disclosure and that the scope of this invention is to be determined solely by the following claims.

I claim:

1. The combination of a power transmitting shaft and a motor shaft having interfitting end portions, compressible means between said end portions, a sleeve encircling said compressible means and said end portions and limiting lateral displacement of the parts, a motor for driving said motor shaft, supporting means for said motor comprising portions spaced apart a distance greater than the dimension of the motor, means securing said motor between said spaced portions so that it may be held loosely and thereafter secured tightly in position, the construction and arrangement of parts when assembled being such that when said motor is operated while held loosely said shafts will center themselves and can be secured in centered position by tightening the mounting of said motor.

2. The combination of a power transmitting shaft and a motor shaft having interfitting end portions, compressible means between said end portions, a sleeve encircling said compressible means and said end portions and limiting lateral displacement of the parts, a motor for driving said motor shaft, supporting means for said motor comprising portions spaced apart a distance greater than the dimension of the motor, means securing said motor between said spaced portions so that it may be held loosely and thereafter secured tightly in position, cushioning means for supporting the motor against the force of said securing means, the construction and arrangement of parts when assembled being such that when said motor is operated while held loosely said shafts will center themselves and can be secured in centered position by tightening the mounting of said motor.

ERIC C. WAHLBERG.

References Cited in the file of this patent

UNITED STATES PATENTS

| Number | Name | Date |
| --- | --- | --- |
| 897,603 | Duncan | Sept. 1, 1908 |
| 1,177,342 | Leiman | Mar. 28, 1916 |
| 1,359,718 | McGuire | Nov. 23, 1920 |
| 1,528,439 | Leiman | Mar. 3, 1925 |
| 1,642,171 | Reavis | Sept. 13, 1927 |
| 1,712,219 | Knudsen | May 7, 1929 |
| 1,890,675 | Doerr et al. | Dec. 13, 1932 |
| 1,986,378 | Smith | Jan. 1, 1935 |
| 2,004,077 | McCartney et al. | June 4, 1935 |
| 2,006,108 | Montuori | June 25, 1935 |
| 2,100,232 | Barry | Nov. 23, 1937 |
| 2,219,142 | Williams | Oct. 22, 1940 |
| 2,252,455 | Bishel | Aug. 12, 1941 |
| 2,291,550 | Heinichen | July 28, 1942 |